Dec. 25, 1956     O. E. HUKARI     2,775,337
DRIVES FOR CONVEYORS
Filed Oct. 21, 1955     2 Sheets-Sheet 1
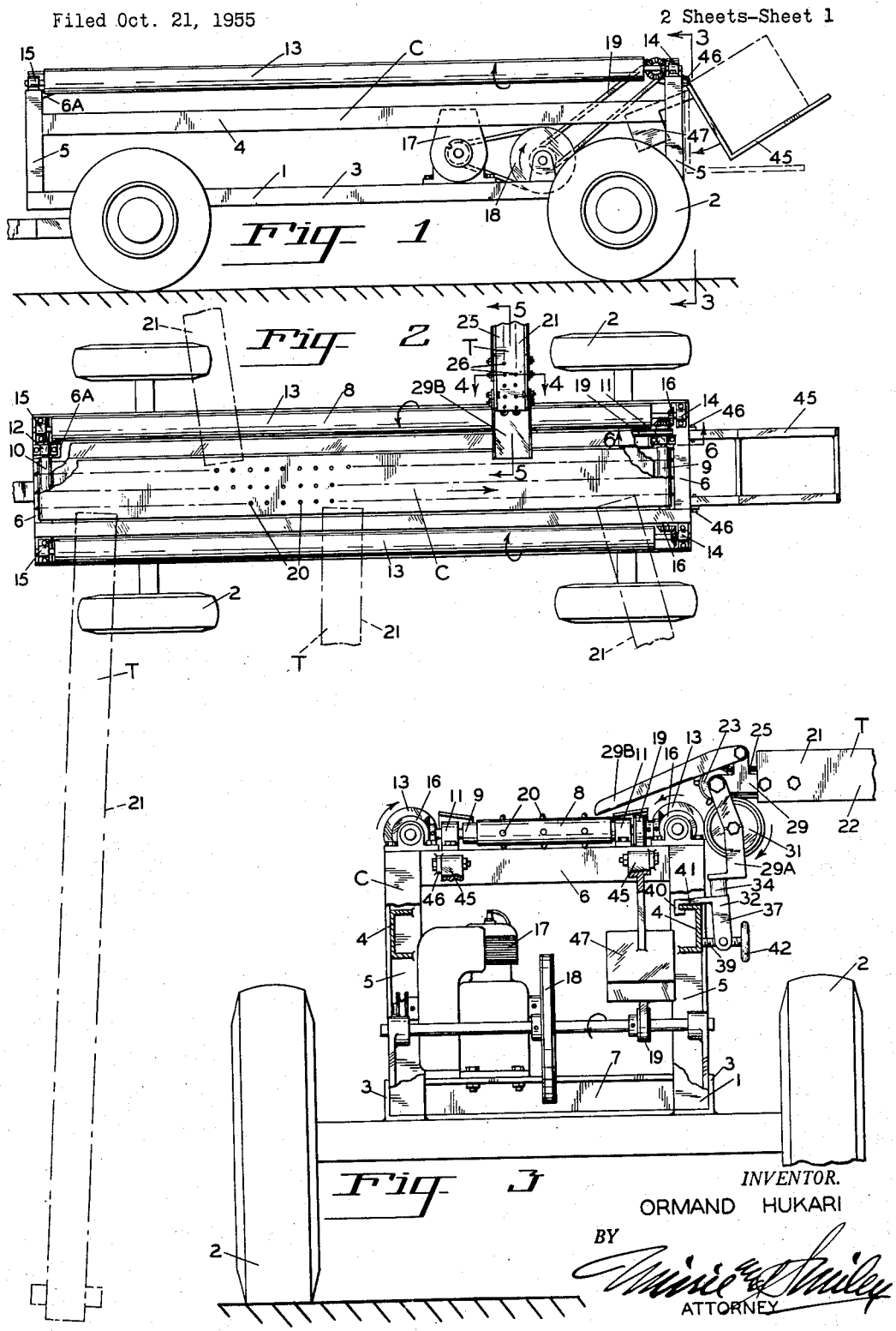
INVENTOR.
ORMAND HUKARI
BY
ATTORNEY Dec. 25, 1956     O. E. HUKARI     2,775,337
DRIVES FOR CONVEYORS
Filed Oct. 21, 1955     2 Sheets-Sheet 2
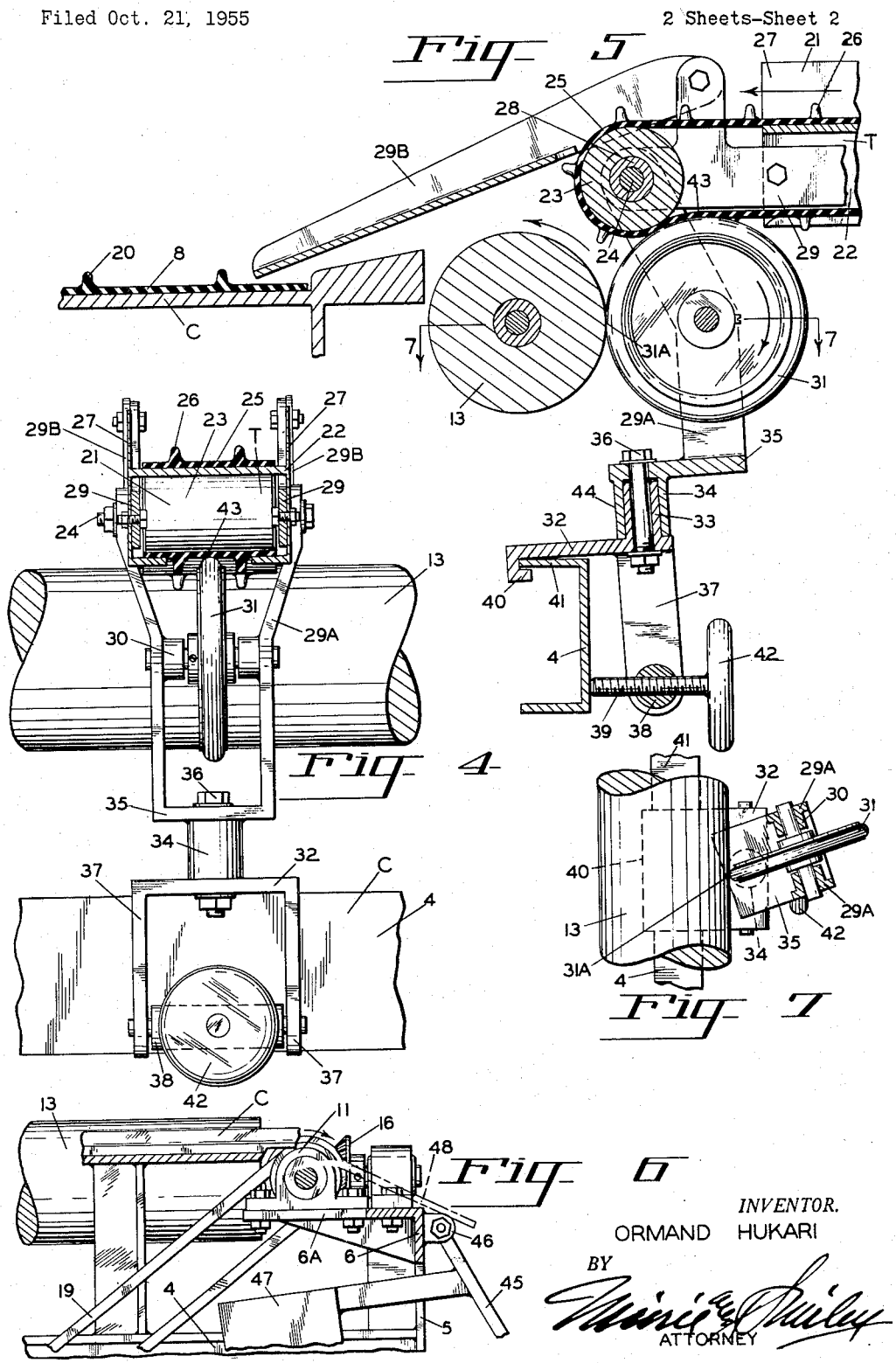
INVENTOR.
ORMAND HUKARI
BY
ATTORNEY

United States Patent Office 2,775,337
Patented Dec. 25, 1956

2,775,337

DRIVES FOR CONVEYORS

Ormand E. Hukari, Hood River, Oreg.

Application October 21, 1955, Serial No. 541,885

8 Claims. (Cl. 198—80)

This invention relates to drives for conveyors, and is particularly adapted to horizontal fruit conveyors.

The primary object of the invention is to provide a drive for conveyors wherein the location of the conveyors can be changed, relative to a receiving conveyor or station, to any location desirable in regards to the said receiving conveyor.

A further object of the invention is to provide a drive for branch conveyors leading in to a main receiving conveyor that will permit the positioning of the branch conveyor at any desired angle to the receiving conveyor operating on a horizontal plane, as well as changing the incline of the said branch conveyor.

A still further object of the invention is to provide a conveyor system that is portable in nature and which is particularly adapted to be used in fruit packing.

These and other incidental objects will be apparent in the drawings, specification and claims.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts through the several figures and in which:

Figure 1 is a side view of the receiving conveyor and driving mechanism;

Figure 2 is a plan view of Figure 1, illustrating one of the horizontal branch conveyors in full line position, and illustrating fragmentary portions of other conveyors associated with the receiving and driving conveyor;

Figure 3 is an end view, partially in section taken on line 3—3 of Figure 1 of the receiving conveyor;

Figure 4 is a fragmentary enlarged sectional view taken on line 4—4 of Figure 2;

Figure 5 is an enlarged fragmentary sectional view taken on line 5—5 of Figure 2;

Figure 6 is an enlarged detail sectional view taken on line 6—6 of Figure 2, and Figure 7 is an enlarged fragmentary view taken on line 7—7 of Figure 5.

Referring now specifically to Figure 2, the present invention is concerned with the usual fruit collecting arrangement including a main mobile conveyor C receiving and collecting fruit from one or more transfer conveyors T which extend laterally from the receiving conveyor C. In operation the receiving conveyor C is positioned to be moved through an orchard between two rows of trees and the transfer conveyors T extend from the receiving conveyor C to positions adjacent the trees. The receiving conveyor C comprises a frame 1, mounted upon wheels 2, and including side members 3 and 4, corner members 5 and end members 6 and 7. A horizontally disposed conveyor belt 8 is trained about a driven roller 9 at one end, and about an idler roller 10 at the opposite end. The roller 9 is journalled in bearings 11, which are mounted by brackets 6A on the end member 6, as shown in Figure 6. The roller 10 is journalled within bearings 12 mounted on the end member 6 at the opposite end of the frame 1.

The conveyor belt 8, preferably, is made of a rubber-like material having protruding detents 20 for moving the fruit therealong. Horizontally and longitudinally disposed driven rollers 13 are journalled within bearings 14 and 15, which are mounted on the cross members 6. These rollers 13 are geared to the roller 9 by way of bevel gears 16 and are driven by the said roller 9. The roller 9 is driven from the engine 17 through a speed reducing counter drive 18 and a belt 19, as shown in Figures 1, 2, 3 and 6.

Horizontally disposed transfer conveyors 21 are adapted to be selectively connected to and driven by the receiving conveyor C for feeding fruit to the latter conveyor. The transfer conveyors 21 each comprise the usual framework 22 supporting a driven roller 23 at one end and an idler roller at the opposite end, not shown, with a conveyor belt 25 trained about said rollers. This belt 25 also has detents 26 adapted to move the fruit along between rails 27 placed on each side of the belt 25. The driven roller 23 is mounted on a bearing sleeve or bushing 28 which is journalled on a shaft 24 that is supported by frames 29 which also support the framework 22 of the conveyor 21.

The frames 29 pivotally support a chute 29B for feeding fruit from the belt 25 to the belt 8, and these frames 29 are pivotally mounted by means of the shaft 24 on a U-shaped frame 29A. Journalled to bearings 30 of the U-shaped frame 29A is a rubber tired friction wheel 31 which bears peripherally on the underside 43 of the belt 25 and presses it against the roller 23. The U-shaped frame 29A has a bottom plate 35 from which depends an upright sleeve spindle 34 that is rotatably mounted on an upright spindle 33 carried by a bracket or clamp 32. A bolt 36 is inserted through the spindle 33 and plate 35 for holding the frame 29A and clamp 32 together.

The clamp 32 has downwardly extending legs 37, and bridging these legs is a revolvable member 38 through which is threaded a screw 39 operated by a hand wheel 42. A hook 40, forming part of the clamp 32, engages a leg 41 of the horizontally disposed frame member 4. The bracket 32 is supported by the frame member and in turn supports the transverse conveyor 21. By rotating the hand wheel 42 and bolt 39, the bracket 32 is adjusted angularly on the frame member 4 to engage the periphery 31A of the wheel 31 with the roller 13. The driving roller 13 frictionally drives the wheel 31 which drives the belt 25 and the roller 23 in the direction of the arrow, Fig. 5. The periphery 31A of the wheel 31 is in line with the edge 44 of the spindle 34 so that the transverse conveyor 21 may be adjusted at an angle to the driving roller 13.

The transfer conveyors 21 can be moved, as shown in dotted lines in Figure 2, to any location along the driving rollers 13 by loosening the screw 39 by means of hand wheel 42 and moving the clamp 32 along the supporting frame 4. The conveyors 21 can also be adjusted to a limited angle from a horizontal plane by simply raising and lowering the outer ends thereof. This would of course tend to loosen or tighten the belt 25 at the point 43, the difference in length of the belt being compensated by the usual tightener mechanism located on the outboard end of the conveyor, not shown.

A special box holding bracket 45 is mounted on the end of the conveyor C on a pivot 46 and has a counterweight 47 connected therewith. When the box is empty the box is tilted, as shown in Figure 1, so that the fruit will not strike the bottom, but will roll down the side of the box, and as the box fills and the weight increases, the bracket 45 will assume a position indicated by broken lines in Figure 1.

In the operation of the conveyor assembly the engine 17 drives the speed reducing mechanism 18, belt 19, roller 9, which roller in turn drives the horizontal drive rollers 13 by way of the bevel gears 16, moving the belt 8 in the direction of the arrow, Figure 2. The rollers 13 drive the wheel 31 which in turn drives the belt 25 of the horizontal transfer conveyor 21, bringing the fruit from the outboard end of conveyors 21 to the receiving conveyor belt 8 from any angle and from most any outboard elevation in regards to the conveyor C.

Although a certain specific embodiment of the invention has been shown and described, it is obvious that many modifications thereof are possible. The invention, therefore, is not to be restricted except insofar as is necessitated by the prior art and by the spirit of the appended claims.

What I claim is:

1. In combination a main conveyor having a conveyor belt, driving means and longitudinally positioned driven rollers, a transfer conveyor for transferring material therefrom to the belt of the main conveyor, and means for releasably and adjustably supporting the transfer conveyor from the main conveyor comprising: a frame supporting the main conveyor, a bracket having a hook portion engaging the frame, means for adjustably supporting the bracket in relation to the frame, a U-shaped frame carried by said bracket, a frame carried by said U-shaped frame for supporting the transfer conveyor, and a friction wheel revolvably mounted in said U-shaped frame and positioned to be engaged by the driven roller of the main conveyor and to engage and drive the belt of the transfer conveyor.

2. The combination set forth in claim 1, said U-shaped frame having a hollow spindle, a bolt passing through said spindle and engaging the bracket to clamp the U-shaped frame and the friction wheel to the bracket in any angular adjustment of the wheel to the longitudinal roller of the main conveyor.

3. The combination set forth in claim 2, and a hand wheel and a threaded bolt engaging a part of the bracket to vary the inclination of the bracket and the friction wheel in relation to the frame of the main conveyor.

4. A conveyor system including a main receiving conveyor and a transfer conveyor to transfer material therefrom to the main conveyor, a main frame supporting the main conveyor and a separate frame supporting said transfer conveyor, means for driving the main conveyor, a roller extending along one side of the main conveyor and driven by said drive means, means for releasably and adjustably supporting the discharge end of said transfer conveyor at a selected location along said main frame and including a bracket releasably attached to said main frame, and a friction wheel drivingly connected with the transfer conveyor and journaled in said bracket in peripheral engagement with said driven roller.

5. A conveyor system as set forth in claim 4, wherein said bracket includes a U-shaped frame straddling the friction wheel and connected with the frame of the transfer conveyor, and a hook shaped member engageable with the main frame and supporting said U-shaped frame, and means on said hook shaped member and engageable with said main frame for adjusting the position of the friction wheel in relation to the driven roller of the main conveyor.

6. A conveyor system as set forth in claim 5, wherein said U-shaped frame is pivotally mounted on said hook shaped member for adjustable positioning the transfer conveyor and friction wheel at any desired angle relative to the driven roller and the main conveyor.

7. A conveyor system as set forth in claim 6, wherein said transfer conveyor comprises an endless conveyor belt and the friction wheel is drivingly connected with the transfer conveyor by frictional engagement with said conveyor belt.

8. A main receiving conveyor for use with at least one transfer conveyor having a drive wheel, said main receiving conveyor comprising a main frame, conveyor means supported on said main frame, means on said main frame for driving said conveyor means, and a roller journaled on said main frame and extending longitudinally along at least one side substantially the full length thereof for frictional engagement with the drive wheel of the transfer conveyor at any selected location of the transfer conveyor along the main conveyor.

References Cited in the file of this patent
UNITED STATES PATENTS

| | | |
|---|---|---|
| 266,003 | Zschech | Oct. 17, 1882 |
| 558,835 | Rademacher | Apr. 21, 1896 |
| 2,321,387 | Jackson | June 8, 1943 |
| 2,647,525 | Duda et al. | Aug. 4, 1953 |